United States Patent
Künzel, et al.

[15] 3,671,614
[45] June 20, 1972

[54] AROMATIC POLYAMIDES CONTAINING THE QUINAZOLONE RING

[72] Inventors: Hans-Egon Künzel; Gerhard Dieter Wolf, both of Dormagen; Gunter Blankenstein, Stommeln; Gunther Nischk, Dormagen, all of Germany

[73] Assignee: Farbenfabriken Bayer Aktiengesellschaft, Leverkusen, Germany

[22] Filed: Nov. 19, 1969

[21] Appl. No.: 878,237

[30] Foreign Application Priority Data

Nov. 28, 1968 Germany.....................P 18 11 411.9

[52] U.S. Cl. ................260/47 CZ, 260/30.2, 260/32.6 N, 260/78 R, 260/256.4 Q, 260/307 G
[51] Int. Cl................................................C08g 20/20
[58] Field of Search ........................................260/78 R

[56] References Cited

UNITED STATES PATENTS 3,527,732  9/1970  Wolf et al.............................260/78 R

OTHER PUBLICATIONS

Textile Terms and Definitions, The Textile Institute, 1963, pp. 48, 156.

*Primary Examiner*—Harold D. Anderson
*Attorney*—Plumley & Tyner

[57] ABSTRACT

New thermally stable aromatic polyamides that are soluble in organic solvents, which polyamides contain quinazolone ring systems and which are produced by poly-condensation of aromatic diamines having one or two quinazolone ring systems in their molecule and aromatic dicarboxylic acid dihalides.

16 Claims, No Drawings

AROMATIC POLYAMIDES CONTAINING THE QUINAZOLONE RING

This invention relates to new, thermally stable, aromatic polyamides containing quinazolone ring systems, and to a process for their preparation.

It is known that high-melting aromatic polyamides can be obtained by polycondensation of aromatic dicarboxylic acid dihalides, for example isophthalic acid dichloride, with aromatic diamines, for example m-phenylene diamine. It is also known that polyamides with outstanding thermal properties can be obtained by polycondensation of diamino-diphenyloxadiazoles or -triazoles with aromatic dicarboxylic acid dihalides.

One disadvantage of the aforementioned polyamides is that they are substantially insoluble in organic solvents. For this reason, alkali metal or alkaline earth metal halides, for example lithium chloride, magnesium bromide or calcium chloride, have to be added as solution promoters to the polycondensation mixtures in amounts of up to 10 percent by weight. Since these salts greatly reduce the temperature stability of the polyamides, they have to be completely removed from the polymers, which in many instances involves considerable complications.

It is an object of this invention to provide polyamides that are stable at high temperatures and the same time are soluble in organic solvents.

This object is accomplished by thermally stable, aromatic polyamides having a relative solution viscosity [$\eta_{rel}$] from 1.3 to 3.8, as measured on a 0.5 percent by weight solution in N-methyl pyrrolidone at 25° C., a softening point above 350° C., comprising recurring structural units of the general formula

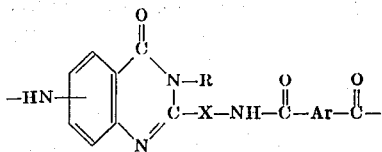

wherein R represents hydrogen or an alkyl, cycloalkyl, aryl, alkaryl, halogenoaryl or aralkyl radical, Ar represents a bivalent aromatic radical and X represents Ar or the group

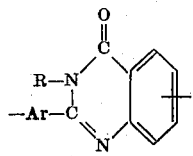

In the above formula Ar represents a bivalent aromatic radical which may also comprise a plurality of optionally substituted aromatic rings which may be attached to one another either through a direct bond or through the groups —O—, —S—, —SO$_2$—, —CH$_2$— or

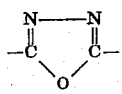

and which may also be substituted by alkyl groups or halogen atoms.

It is another object of this invention to provide a process for the production of thermally stable aromatic polyamides which comprises reacting an aromatic diamine having one or two quinazolone rings in the molecule, with an aromatic dicarboxylic acid dihalide, said reacting being carried out in a polar organic solvent at a temperature of from —30° to +150° C.

The following compounds are examples of dicarboxylic acid dihalides that are preferably suitable for use in the polycondensation reaction: diphenyl-4,4'-dicarboxylic acid dichloride; naphthalene-1,5-dicarboxylic acid dichloride; diphenyl ether-4,4'-dicarboxylic acid dichloride; diphenyl sulphone-4,4'-dicarboxylic acid dichloride; isophthalic acid dichloride; terephthalic acid dichloride; the corresponding dibromides; and alkyl- and halogen-substitution products of the afore-mentioned acid dihalides.

The following compounds are examples of aromatic diamines having one quinazolone ring in the molecule and being suitable for use in the process according to the invention:

6- or 7-amino-2-(m-aminophenyl)-3-methyl-4(3H)-quinazolone;

7-amino-2-(p-aminophenyl)-3-phenyl-4(3H)-quinazolone;

6- or 7-amino-2-(m-aminophenyl)-3-phenyl-4-(3H)-quinazolone;

6- or 7-amino-2-[3'-(p-aminophenoxy)-phenyl]-3-methyl-4(3H)-quinazolone;

6- or 7-amino-2-[4'-(p-aminophenoxy)-phenyl]-3-methyl-4(3H)-quinazolone;

6- or 7-amino-2-[3'-(p-aminophenoxy)-phenyl]-3-methyl-4(3H)-quinazolone;

6- or 7-amino-2-[4'-(p-aminophenoxy)-phenyl]-3-phenyl-4(3H)-quinazolone;

6- or 7-amino-2-[3'-(p-aminophenoxy)-phenyl]-3-ethyl-4(3H)-quinazolone;

6- or 7-amino-2-[4'-(p-aminophenoxy)-phenyl]-3-ethyl-4(3H)-quinazolone;

6- or 7-amino-2-[3'-(p-aminosulphonyl)-phenyl]-3-phenyl-4(3H)-quinazolone;

The following are examples of diamines having two quinazolone rings and are suitable for the process of this invention:

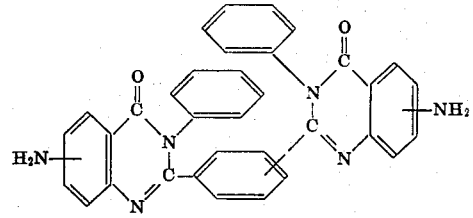

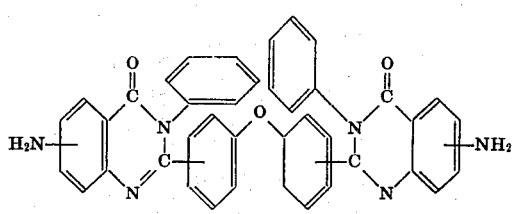

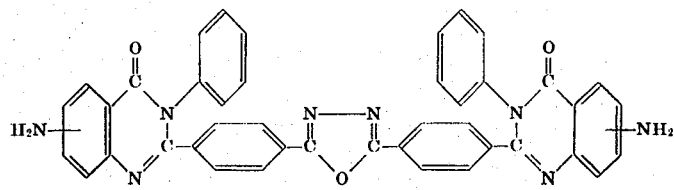

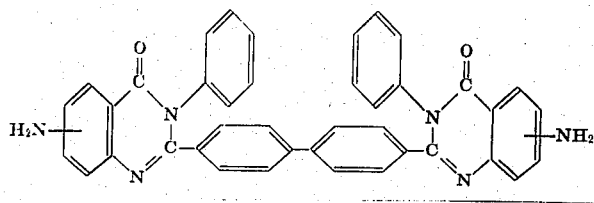

The diamines having one quinazolone ring can be obtained from 4- or 5-nitroanthranilic acid, either by reaction with an acid chloride containing a nitro group by way of the corresponding benzoxazinones and reacting these with ammonia or a corresponding amine to form a dinitro quinazolone, followed by hydrogenation; or by reaction with an N-substituted nitrobenzimide chloride to form a dinitroquinazolone followed by hydrogenation.

Dinitro compounds containing two benzoxazinone rings can be similarly obtained by reacting 4- or 5-nitroanthranilic acid with a dicarboxylic acid dichloride, and may be subsequently converted with amines into the corresponding dinitrodiquinazolones. The dinitrodiquinazolones may also be obtained by reacting 4- or 5-nitroanthranilic acid with N,N'-disubstituted dicarboxylic acid bis-imide chlorides. Reduction of the dinitro compounds yields the corresponding diamines.

The polycondensation of these diamines having one or two quinazolone rings with the aromatic dicarboxylic acid dihalides is preferably carried out in polar organic solvents such as N,N'-dialkyl carboxylic acid amides, for example dimethyl acetamide, or N-substituted lactams, for example N-methyl pyrrolidone. The major advantage of these solvents is that it is possible to operate in the absence of additional acid-acceptors. In order to obtain reaction products of extremely high molecular weight, it is advisable to use the diamine and the dicarboxylic acid dihalide in equivalent or substantially equivalent quantities. The condensation reaction is carried out at a temperature of from −30° to +150° C., and preferably at a temperature of from −10° to +30° C. The reaction time can, for example, be from 1 to 30 hours. The resulting solutions have a solids content which is generally from 5 to 40 percent by weight, and preferably from 10 to 25 percent by weight.

The polyamides containing quinazolone rings prepared in accordance with the invention show outstanding stability at high temperatures and are highly soluble in polar organic solvents. They may readily be processed from these solutions into films, sheets, filaments and bristles showing outstanding thermal and mechanical properties. For example, strengths of 8 to 11 g/dtex were achieved in the case of filaments. The symbol dtex is an abbreviation of decitex and is the weight of 10,000 meters of a filament expressed in grams. In some instances, films only turn brittle after storage for 3 to 5 weeks at 300° C.

The following examples are to further illustrate the invention without limiting it.

EXAMPLE 1

101.5 parts by weight of terephthalic acid dichloride are slowly introduced at 5° to 15° C. into a solution of 210 parts by weight of 2-]3'-(p-aminophenoxy)-phenyl]-3-phenyl-7-amino-4-(3H)-quinazolone in 940 parts by weight of anhydrous N,N-dimethyl acetamide. On completion of the addition, the batch is stirred for 10 hours at room temperature. A highly viscous solution is obtained which may be directly processed into films and filaments. The polymer thus obtained has a relative viscosity of 2.35 as measured on a 0.5 percent by weight solution in N-methyl pyrrolidone at 25° C. The polyamide has a softening point above 350° C. Filaments prepared therefrom have strengths of from 3 to 4.5 g/dtex. Films obtained from this polyamide only turn brittle after storage for 4 weeks at 300° C.

The 2-[3'-(p-aminophenoxy)-phenyl]-3-phenyl-7-amino-4(3H)-quinazolone, melting at 253° to 256° C., was obtained by reacting 4-nitroanthranilic acid and N-phenyl-3-(p-nitrophenoxy)-benzimide chloride to form 2-[3'-(p-nitrophenoxy)-phenyl]-3-phenyl-7-nitro-4(3H)-quinazolone (m.p. 238° to 241° C.) and hydrogenating this compound.

EXAMPLES 2 and 3

If the diamine used in Example 1 is replaced by an equivalent quantity of 2-[3'-(p-aminophenoxy)-phenyl]-3-phenyl-6-amino-4-(3H)-quinazolone (m.p. 251° to 254° C.) or 2-[4'-(p-aminophenoxy)-phenyl]-3-phenyl-6-amino-4-(3H)-quinazolone (m.p. 272° to 276° C.), without any other changes in the procedure adopted in Example 1, highly viscous polyamide solutions are again obtained which can be directly converted into films and fibers. The polyamides had relative viscosities of 2.28 and 2.24, respectively, measured as in Example 1. Strengths of up to 4.5 g/dtex were measured on filaments prepared from these polyamides. Films only turn brittle after storage for 8 to 14 days at temperatures of 300° C. The 2-[3'-(p-aminophenoxy)-phenyl]-3-phenyl-6-amino-4-(3H)-quinazolone and the 2-[4'-(p-aminophenoxy)-phenyl]-3-phenyl-6-amino-4-(3H)-6-quinazolone were prepared analogously to the method given in Example 1 for the 2-[3'-(p-amino-phenoxy)-phenyl]-3-phenyl-7-amino-4-(3H)-quinazolone using the corresponding starting materials.

EXAMPLE 4

101.5 parts by weight of terephthalic acid dichloride are introduced at 10° to 15° C. into a solution of 179 parts by weight of 2-[3'-(p-aminophenoxy)-phenyl]-3-methyl-6-amino-4(3H)-quinazolone (m.p. 276° to 279° C.) in 850 parts by weight of dry N,N-dimethyl acetamide. On completion of the addition, the highly viscous solution is stirred for 5 hours at room temperature. The polyamide has a relative viscosity of 2.18, measured as described in Example 1. Strengths of from 7 to 9 g/dtex were measured on filaments, whilst films only turned brittle after storage for 1½ weeks at 300° C.

The quinazolone compound used was produced by a method analogous to the one given in Example 1.

EXAMPLE 5

101.5 parts by weight of isophthalic acid dichloride are added at 5° to 15° C. to a solution of 179 parts by weight of 2-[4'-(p-aminophenoxy)-phenyl]-3-methyl-6-amino-4(3H)-quinazolone in 840 parts by volume of N-methyl pyrrolidone. On completion of the addition, the highly viscous solution is stirred for another 6 hours. The resulting polyamide has a relative viscosity of 2.53.

The quinazolone compound used was produced by a method analogous to the one given in Example 1.

EXAMPLE 6

If the diamine used in Example 5 is replaced by an equivalent quantity of 2-[4'-(p-aminophenoxy)-phenyl]-3-methyl-7-amino-4(3H)-quinazolone (m.p. 216° to 217° C.) without any other changes in the procedure adopted in Example 5, a polyamide with a relative viscosity of 2.48 is obtained.

The quinazolone compound used was produced by a method analogous to the one given in Example 1.

EXAMPLE 7

101.5 parts by weight of terephthalic acid dichloride are added at 10° to 15° C. to a solution of 186 parts by weight of 2-[3'-(p-aminophenoxy)-phenyl]-3-ethyl-6-amino-4(3H)-quinazolone (m.p. 200° to 201° C.) in 870 parts by weight of N,N-dimethyl acetamide. Completion of the addition is followed by stirring for 6 hours at room temperature. The polyamide has a relative viscosity of 2.37, measured as in Example 1. Strengths of from 8 to 11 g/dtex were measured on filaments, whilst films only turn brittle after storage for 8 to 14 days at 300°C.

The quinazolone compound used was produced by a method analogous to the one given in Example 1.

EXAMPLES 8 and 9

If the diamine used in Example 7 is replaced by an equivalent quantity of 2-[4'-(p-aminophenoxy)-phenyl]-3-ethyl-6-amino-4(3H)-quinazolone (m.p. 212 to 214°C) or of 2-[4'-(p-aminophenoxy)-phenyl]-3-ethyl-7-amino-4(3H)-quinazolone (m.p. 200° to 204° C.) without any other changes in the procedure adopted in Example 7, highly viscous polyamide solutions, which can be directly converted into filaments and films, are again obtained. The polyamides have relative viscosities of 2.35 and 2.68, respectively, measured as described in Example 1.

The quinazolone compounds used were produced by a method analogous to the one given in Example 1.

EXAMPLE 10

101.5 parts by weight of terephthalic acid dichloride are introduced at 10° to 15° C. into a solution of 234 parts by weight of 2-]3'-(p-aminophenylsulphonyl)-phenyl]-3-phenyl-6-amino-4(3H)-quinazolone (m.p. 270° to 272° C.) in 1,000 parts by volume of N,N-dimethyl acetamide. On completion of the addition, the highly viscous solution is stirred for 8 hours at room temperature. The polyamide has a relative viscosity of 1.58, measured as in Example 1.

The quinazolone compound used was produced by a method analogous to the one given in Example 1.

EXAMPLE 11

101.5 parts by weight of isophthalic acid dichloride are added at 15° C. to a solution of 133 parts by weight of 2-(m-aminophenyl)-3-methyl-6-amino-4(3H)-quinazolone (m.p. 228° to 230° C.) in 720 parts by weight of N-methyl pyrrolidone. The highly viscous solution is stirred for 10 hours at room temperature and can then be directly processed. The polyamide has a relative viscosity of 1.84, measured as in Example 1.

The quinazolone compound used was produced by a method analogous to the one given in Example 1.

EXAMPLES 12 and 13

Following the procedure adopted in Example 11, 164 parts by weight of 2-(p-aminophenyl)-3-phenyl-7-amino-4(3H)-quinazolone (m.p. 255° to 257° C.) and 164 parts by weight of 2-(m-aminophenyl)-3-phenyl-6-amino-4(3H)-quinazolone (m.p. 235° to 237° C.) are separately reacted with 101.5 parts by weight of isophthalic acid dichloride in 800 parts by weight of N-methyl pyrrolidone. The resulting polyamides have relative viscosities of 2.07 and 1.82, respectively.

The quinazolone compounds used were produced by a method analogous to the one given in Example 1.

EXAMPLES 14 and 15

Following the procedure described in Example 1, 227.75 parts by weight of 2-[4'-(p-aminophenoxy)-phenyl]-3-(p-chlorophenyl)-7-amino-4(3H)-quinazolone and 2-[4'-(p-aminophenoxy)-phenyl]-3-(p-chlorophenyl)-6-amino-4(3H)-quinazolone (m.p. 254° to 256° C.) are separately reacted with 101.5 parts by weight of terephthalic acid dichloride in 1,000 parts by weight of N,N-dimethyl acetamide. The resulting polyamides had relative viscosities of 2.06 and 1.98, respectively.

The quinazolone compounds used were produced by a method analogous to the one given in Example 1.

None of the polyamides prepared could be seen to soften at temperatures below 350° C.

What we claim is:

1. A thermally stable, aromatic polyamide having a relative solution viscosity [ $\eta_{rel}$ ] from 1.3 to 3.8, as measured on a 0.5 percent by weight solution in N-methyl pyrrolidone at 25° C., a softening point above 350° C., consisting essentially of recurring structural units of the formula

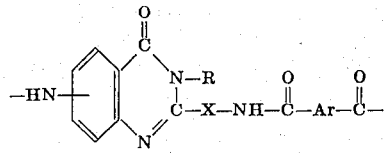

wherein R is hydrogen or an alkyl, cycloalkyl, aryl, alkaryl, halogen substituted aryl, or aralkyl radical; Ar is a bivalent carbocyclic aromatic radical; and X is Ar.

2. The polyamide of claim 1 wherein the recurring structural unit is

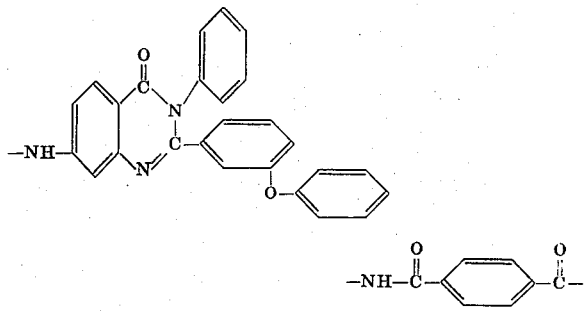

3. The polyamide of claim 1 wherein the recurring structural unit is

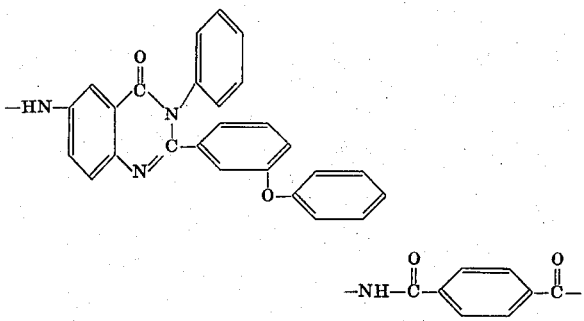

4. The polyamide of claim 1 wherein the recurring structural unit is

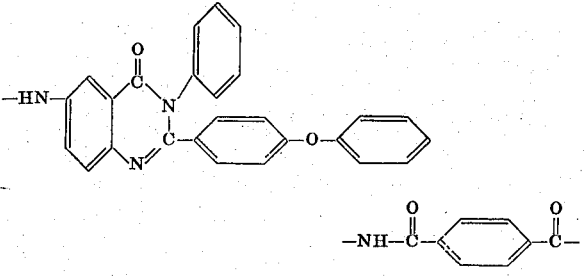

5. The polyamide of claim 1 wherein the recurring structural unit is

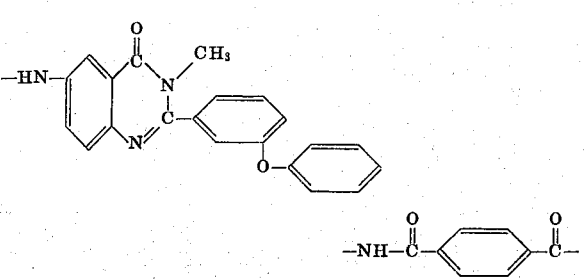

6. The polyamide of claim 1 wherein the recurring structural unit is

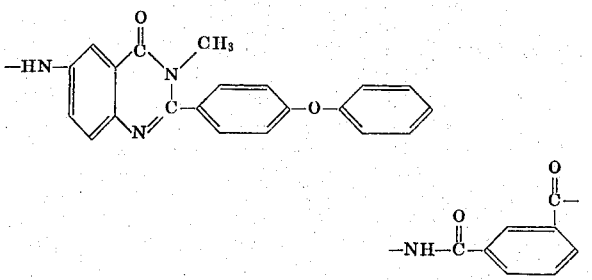

7. The polyamide of claim 1 wherein the recurring structural unit is

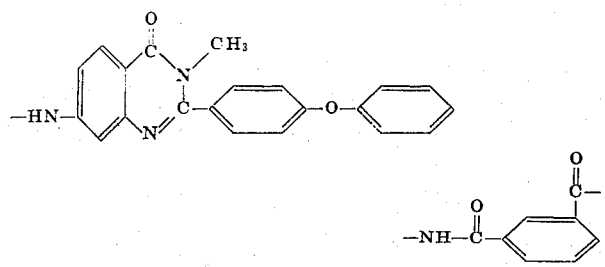

8. The polyamide of claim 1 wherein the recurring structural unit is

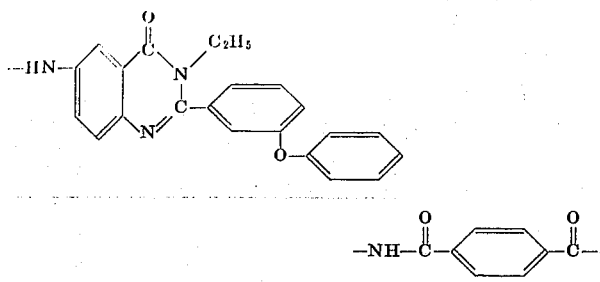

9. The polyamide of claim 1 wherein the recurring structural unit is

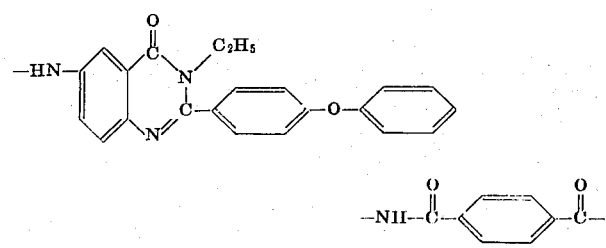

10. The polyamide of claim 1 wherein the recurring structural unit is

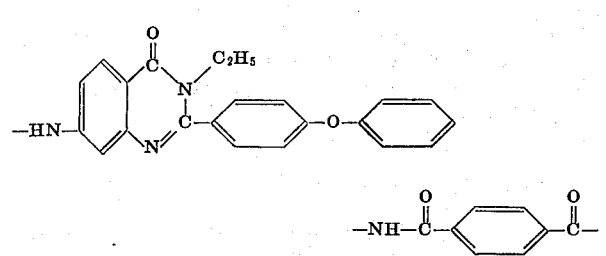

11. The polyamide of claim 1 wherein the recurring structural unit is

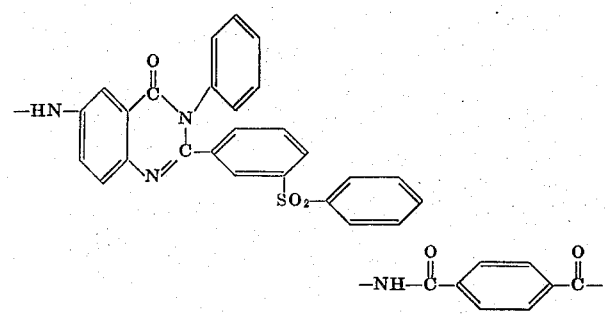

12. The polyamide of claim 1 wherein the recurring structural unit is

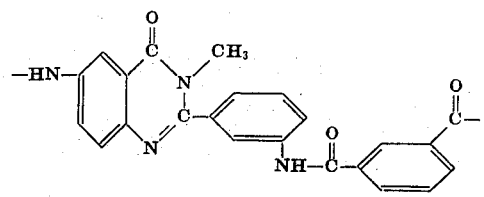

13. The polyamide of claim 1 wherein the recurring structural unit is

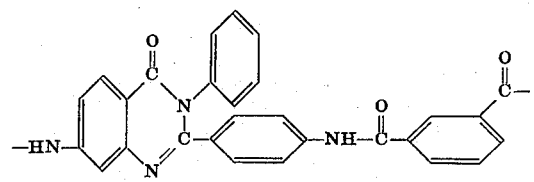

14. The polyamide of claim 1 wherein the recurring structural unit is

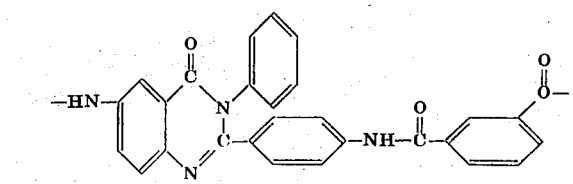

15. The polyamide of claim 1 wherein the recurring structural unit is

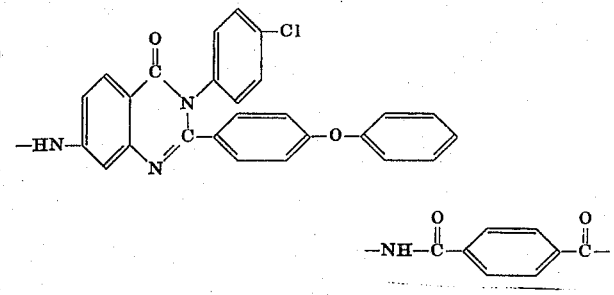

16. The polyamide of claim 1 wherein the recurring structural unit is

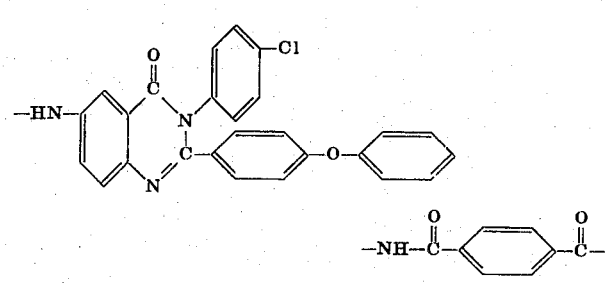

* * * * *